12/16/1965

United States Patent Office 3,169,990
Patented Feb. 16, 1965

3,169,990
PROCESS FOR THE PRODUCTION OF THIURAM MONOSULFIDES
Adolf Frank, Leverkusen, and Ferdinand Grewe, Cologne-Stammheim, Germany, assignors to Farbenfabriken Bayer Aktiengesellschaft, Leverkusen, Germany, a corporation of Germany
No Drawing. Filed Apr. 11, 1961, Ser. No. 102,107
Claims priority, application Germany, Apr. 14, 1960,
F 31,008
8 Claims. (Cl. 260—567)

The present invention relates to a new and very economical process of preparing alkylene- or arylene-diamine-dithiocarbamic acid anhydrides or so called (poly)-alkylene or arylene-thiuram-monosulfides.

A substance which is generally described as (poly)-ethylene-thiuram monosulfide is known to be an active fungicide and is of considerable practical interest as such.

It is known that this compound can be produced by desulfurisation of the oxidation products of ethylene bis-dithio-carbamic acid or its salts e.g. by treating these oxidation products with sodium cyanides (e.g. according to U.S. Patent No. 2,859,246) or by treating the sodium salt of the ethylene bis-dithiocarbamic acid with cyanogen chloride, (e.g. according to Belgian Patent No. 564,066).

Furthermore, the (poly)-ethylene thiuram monosulfide has been described to be obtainable by conducting air or oxygen in the presence of catalysts into dilute solutions of ethylene bis-dithio-carbamic acid salts (in British Patent No. 789,470 there is described e.g. this method) or by treating with phosgene the sodium salt of ethylene bis-dithiocarbamic acid advantageously under anhydrous conditions (see here Belgian Patent No. 564,065).

In accordance with the present invention it has now been found that bis-dithiocarbamic acids or their salts derived from primary diamines can be transformed into the corresponding thiuram monosulfides by treating the product produced by the oxidation of a compound selected from the group consisting of alkylene bisdithiocarbamic acids, phenylene, bisdithiocarbamic acids and the disodium salts thereof (as oxidizing agents there may be used for example potassium ferricyanide, dilute chlorine, sodium persulfate, ammonium persulfate, hydrogen peroxide and dilute sulfuric acid or sodium nitrite and dilute sulfuric acid or similar oxidizing agents) with water or organic solvents, such as halogenated or unhalogenated aliphatic or aromatic hydrocarbons, ethers, ketones, and the like, especially, however, with lower aliphatic alcohols at temperatures up to 100° C., preferably between 40–60° C.

The method described in British Patent No. 789,470 yields compounds which are not identical with the pure thiuram monosulfides which are obtained according to the invention described above.

The treatment furthermore is carried out mainly with methanol or water and at temperatures of about 50° C. The reaction proceeds mostly with the liberation of or splitting off of hydrogen sulfide. The process according to the invention has the advantages of greater simplicity and economy and enables the reaction time to be reduced e.g. to 1/10 of that required for carrying out hitherto known processes. Moreover, the yield is higher and the purity of the products obtained is excellent.

The following examples are given for illustrating the present invention.

Example 1

An oxidation product from 1.8 mol of sodium ethylene bis-dithiocarbamate prepared by using a solution of hydrogen peroxide in dilute sulfuric acid as oxidizing agent is suspended in a 4-litre three neck flask with 1.2 litres of methanol and slowly heated with good stirring to 50° C. Stirring is continued at 50° C. for 30–45 minutes after which the suspended solid residue is separated by filtration with suction while warm. The residue is washed with methanol and dried at a temperature of 50° C. The pale yellow product obtained weighs 290 grams (=90.3% of the theoretical) and melts at 156–176° C.

Example 2

An oxidation product from 0.11 mol of sodium ethylene bis-dithiocarbamate produced by oxidation with ammonium persulfate ($(NH_4)_2S_2O_8$ is) suspended in a 500-ml. flask with 250 ml. of water with good stirring and slowly heated to 50° C. After 15 minutes the evolution of hydrogen sulfide has almost completely stopped. After filtering off the suspended solid residue with suction while warm, it is washed with water and dried at 50° C. Yield 18 grams (=92% of the theoretical).

Example 3

An oxidation product from 0.11 mol of sodium ethylene bis-dithiocarbamic acid produced by chlorine oxidation is treated with 250 ml. of acetone at 50° C. for 15 minutes as described in Example 2. Yield after filtering, washing with acetone and drying at 50° C. is 11 grams (=56.2% of the theoretical).

Example 4

An oxidation product from 0.11 mol of sodium ethylene bis-dithiocarbamate produced by oxidation with a solution of sodium nitrite in dilute sulfuric acid is treated with 250 ml. of chloroform at 50° C. for 15 minutes as described in Example 2. Yield after filtering off the suspended solid residue with suction, washing with chloroform and drying at 50° C., was 16 grams (=81.7% of the theoretical).

Example 5

An oxidation product from 0.11 mol of sodium ethylene bis-dithiocarbamate produced by oxidation in water with potassium ferricyanide ($K_3Fe(CN)_6$) yields upon treatment with 250 ml. of ligroin as described in Example 2, 15.5 grams (=79.2% of the theoretical) of a pale yellow product.

Example 6

An oxidation product from 0.1 mol of sodium hexamethylene bis-dithiocarbamate produced by oxidation with ammonium persulfate (($NH_4)_2S_2O_8$) is suspended with 250 ml. of methanol, whereby the finely powdered product soon cakes or agglomerates together. After standing over night the paste again solidifies. The reaction product is filtered off with suction and dried in vacuum at about 50° C. Yield 18 grams.

Example 7

As described in Example 6 an oxidation product is prepared from 0.1 mol of sodium hexamethylene bis-dithiocarbamate by oxidation with a solution of hydrogen peroxide in dilute sulfuric acid, which is treated with 200 ml. of chloroform. After filtering off the suspended solid residue with suction and drying at 50° C. 16 grams of a product is obtained which has a sulfur content of 41.7%, a nitrogen content of 11.3% and melts at 100° C. with decomposition. The starting material had a melting point of 82° C. with decomposition.

Example 8

In analogous manner to that described in Example 2 an oxidation product is prepared from 0.1 mol of sodium 1,2-propylene bis-dithiocarbamate by oxidation with ammonium persulfate (($NH_4)_2S_2O_8$) which is then treated with 250 ml. of methanol. Yield after filtering off with suction, washing with methanol and drying at 50° C.:

18 grams (=67% of the theoretical). When heated the product decomposes beginning at 97° C. It contains 49.8° of organically bound sulfur.

*Example 9*

An oxidation product from 0.1 mol of sodium p-phenylene bis-dithiocarbamate, produced by oxidation with potassium ferricyanide ($K_3Fe(CN)_6$), is treated with 250 ml. of methanol as described in Example 2. Yield of reaction product after filtering off with suction, washing with methanol and drying at 50° C.: 11.3 grams; M.P. 275° C.; and sulfur content: 40.3%.

We claim:
1. A process for the production of thiuram monosulfides which comprises desulfurizing the product produced by the oxidation of a compound selected from the group consisting of alkylene bis-dithiocarbamic acids, phenylene bis-dithiocarbamic acids and the disodium salts thereof by treating said product at a temperature up to about 100° C. with, as the only desulfurizing agent, a member selected from the group consisting of water and organic solvents.
2. The process of claim 1 wherein the desulfurizing agent is water.
3. The process of claim 1 wherein the desulfurizing agent is methanol.
4. The method of claim 1 wherein the desulfurizing agent is acetone.
5. The method of claim 1 wherein the desulfurizing agent is chloroform.
6. The method of claim 1 wherein the desulfurizing agent is ligroin.
7. The process of claim 1 wherein the temperature during treatment is maintained between 40 and 60° C.
8. The process of claim 1 wherein the desulfurizing agent used is methanol, the temperature during treatment is maintained at approximately 50° C. and the treatment is continued for a period of between 30 and 45 minutes.

References Cited in the file of this patent

UNITED STATES PATENTS

| | | |
|---|---|---|
| 2,766,274 | Flenner | Oct. 9, 1956 |
| 2,830,060 | Ford | Apr. 18, 1958 |
| 2,859,246 | Martin et al. | Nov. 4, 1958 |

FOREIGN PATENTS

| | | |
|---|---|---|
| 564,065 | Belgium | Feb. 15, 1958 |
| 578,684 | Great Britain | July 8, 1946 |

OTHER REFERENCES

Dogadkin et al.: C.A., vol. 54, p. 18527 (1959).
Klebanskii et al.: Zhur. Obshchei Khim., vol. 30, pp. 794–8 (1960).